US009607654B2

(12) United States Patent
Leppanen et al.

(10) Patent No.: US 9,607,654 B2
(45) Date of Patent: Mar. 28, 2017

(54) VIDEO EDITING

(71) Applicant: Nokia Corporation, Espoo (FI)

(72) Inventors: Jussi A. Leppanen, Tampere (FI); Arto J. Lehtiniemi, Lempaala (FI); Antti J. Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 141 days.

(21) Appl. No.: 14/576,188

(22) Filed: Dec. 18, 2014

(65) Prior Publication Data
US 2015/0179223 A1 Jun. 25, 2015

(30) Foreign Application Priority Data

Dec. 19, 2013 (EP) .................................... 13198644

(51) Int. Cl.
| H04N 5/931 | (2006.01) |
| H04N 5/932 | (2006.01) |
| H04N 5/935 | (2006.01) |
| G11B 27/036 | (2006.01) |
| G11B 27/034 | (2006.01) |
| G11B 27/34 | (2006.01) |
| H04N 21/472 | (2011.01) |
| G11B 27/031 | (2006.01) |
| H04N 5/247 | (2006.01) |

(Continued)

(52) U.S. Cl.
CPC .......... *G11B 27/036* (2013.01); *G11B 27/031* (2013.01); *G11B 27/034* (2013.01); *G11B 27/34* (2013.01); *H04N 5/247* (2013.01); *H04N 5/91* (2013.01); *H04N 21/4307* (2013.01); *H04N 21/43637* (2013.01); *H04N 21/47205* (2013.01); *H04N 21/8547* (2013.01)

(58) Field of Classification Search
CPC ........ H04N 5/931; H04N 5/932; H04N 5/935; H04N 5/77; H04N 5/232
USPC ............. 348/211.11, 211.12, 211.13, 211.14, 348/211.8; 386/223, 209, 210, 224, 227
See application file for complete search history.

(56) References Cited

U.S. PATENT DOCUMENTS

2001/0033332 A1* 10/2001 Kato ................ G08B 13/19645
348/211.99
2005/0188399 A1 8/2005 Tischer
(Continued)

FOREIGN PATENT DOCUMENTS

EP 1887795 A1 2/2008
EP 2398021 A2 12/2011
(Continued)

OTHER PUBLICATIONS ios6—FaceTime over Cellular Access, Sep. 2012.*
(Continued)

*Primary Examiner* — Daquan Zhao
(74) *Attorney, Agent, or Firm* — Harrington & Smith

(57) ABSTRACT

A method, an apparatus and a computer program are provided. The method comprises: causing a computing device to enter a video editing mode in which first video content, captured by a first camera in a location, is played back on a display of the computing device and included in a video edit; and causing the display to overlay at least one visual indicator on the first video content, the at least one visual indicator indicating that second video content, captured by a second camera at the location, is available for inclusion in the video edit.

14 Claims, 10 Drawing Sheets

(51) Int. Cl.
*H04N 5/91* (2006.01)
*H04N 21/43* (2011.01)
*H04N 21/4363* (2011.01)
*H04N 21/8547* (2011.01)
H04N 5/77 (2006.01)
H04N 5/232 (2006.01)

(56) References Cited

U.S. PATENT DOCUMENTS

| | | |
|---|---|---|
| 2005/0195206 A1* | 9/2005 | Wogsberg .............. H04N 5/265 345/547 |
| 2009/0148124 A1 | 6/2009 | Athsani et al. |
| 2013/0177293 A1 | 7/2013 | Mate et al. |
| 2013/0259446 A1 | 10/2013 | Sathish |

FOREIGN PATENT DOCUMENTS

| | | |
|---|---|---|
| EP | 2573772 A1 | 3/2013 |
| WO | 2009027818 A2 | 3/2009 |
| WO | 2010119181 A1 | 10/2010 |
| WO | 2012167238 A1 | 12/2012 |

OTHER PUBLICATIONS

European Patent Office Search Report and Opinion from corresponding European Patent Application No. 13198644.0, dated Mar. 27, 2014, 7 pages.

\* cited by examiner

VIDEO EDITING

RELATED APPLICATION

This application claims priority to European Application No. 13198644.0 filed Dec. 19, 2013, which is incorporated herein by reference in its entirety.

TECHNOLOGICAL FIELD

Embodiments of the present invention relate to video editing.

BACKGROUND

Video editing is a process of editing motion video footage after it has been captured.

BRIEF SUMMARY

According to various, but not necessarily all, embodiments of the invention there is provided a method, comprising: causing a computing device to enter a video editing mode in which first video content, captured by a first camera in a location, is played back on a display of the computing device and included in a video edit; and causing the display to overlay at least one visual indicator on the first video content, the at least one visual indicator indicating that second video content, captured by a second camera at the location, is available for inclusion in the video edit.

According to various, but not necessarily all, embodiments of the invention there is provided an apparatus, comprising: means for causing a computing device to enter a video editing mode in which first video content, captured by a first camera in a location, is played back on a display of the computing device and included in a video edit; and means for causing the display to overlay at least one visual indicator on the first video content, the at least one visual indicator indicating that second video content, captured by a second camera at the location, is available for inclusion in the video edit.

According to various, but not necessarily all, embodiments of the invention there is provided an apparatus, comprising: at least one processor; at least one memory storing computer program instructions that, when performed by the at least one processor, cause at least the following to be performed: causing a computing device to enter a video editing mode in which first video content, captured by a first camera in a location, is played back on a display of the computing device and included in a video edit; and causing the display to overlay at least one visual indicator on the first video content, the at least one visual indicator indicating that second video content, captured by a second camera at the location, is available for inclusion in the video edit.

According to various, but not necessarily all, embodiments of the invention there is provided a non-transitory computer readable medium storing a computer program comprising computer program instructions that, when performed by at least one processor, cause the following to be performed: causing a computing device to enter a video editing mode in which first video content, captured by a first camera in a location, is played back on a display of the computing device and included in a video edit; and causing the display to overlay at least one visual indicator on the first video content, the at least one visual indicator indicating that second video content, captured by a second camera at the location, is available for inclusion in the video edit.

According to various, but not necessarily all, embodiments of the invention there is provided a method, comprising: capturing first video content, using a first camera, in a first location; enabling a user to create, on a computing device, a video edit including at least a portion of the first video content and at least a portion of second video content, captured using a second camera in the first location and received from a further computing device using a peer-to-peer connection.

According to various, but not necessarily all, embodiments of the invention there is provided an apparatus, comprising: means for capturing first video content, using a first camera, in a first location; means for enabling a user to create, on a computing device, a video edit including at least a portion of the first video content and at least a portion of second video content, captured using a second camera in the first location and received from a further computing device using a peer-to-peer connection.

According to various, but not necessarily all, embodiments of the invention there is provided an apparatus, comprising: at least one processor; at least one memory storing computer program instructions that, when performed by the at least one processor, cause at least the following to be performed: capturing first video content, using a first camera, in a first location; enabling a user to create, on a computing device, a video edit including at least a portion of the first video content and at least a portion of second video content, captured using a second camera in the first location and received from a further computing device using a peer-to-peer connection.

According to various, but not necessarily all, embodiments of the invention there is provided a non-transitory computer readable medium storing a computer program comprising computer program instructions that, when performed by at least one processor, cause the following to be performed: capturing first video content, using a first camera, in a first location; enabling a user to create, on a computing device, a video edit including at least a portion of the first video content and at least a portion of second video content, captured using a second camera in the first location and received from a further computing device using a peer-to-peer connection.

BRIEF DESCRIPTION

For a better understanding of various examples that are useful for understanding the detailed description, reference will now be made by way of example only to the accompanying drawings in which.

DETAILED DESCRIPTION

Figure 1:
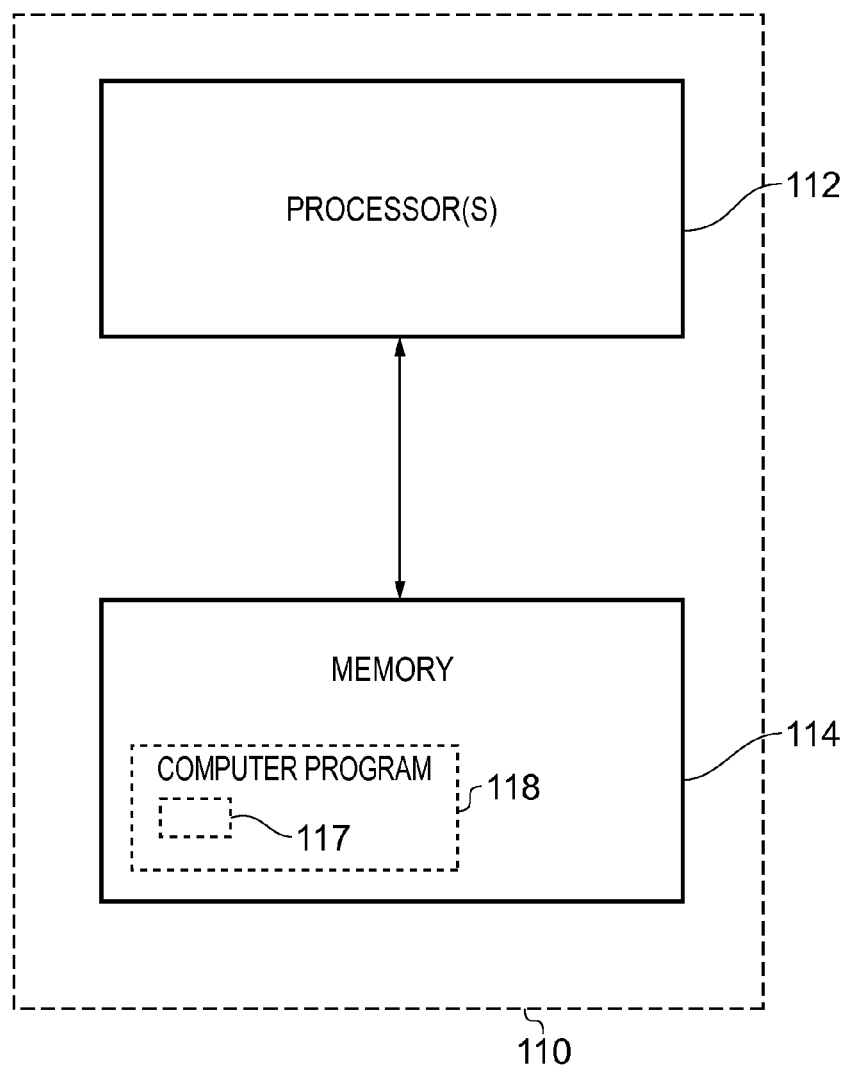
FIG. 1 illustrates an apparatus in the form of a chipset.
Figure 1:
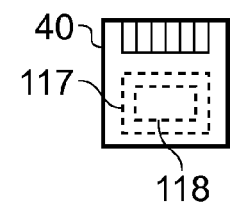

Example embodiments of the invention provide various techniques for editing video on an electronic device such as a portable electronic device. In an example embodiment, a method of creating a video edit which includes video content captured by multiple different cameras is provided.

In this regard, the figures illustrate a method, comprising: causing a computing device 100 to enter a video editing mode in which first video content 136, captured by a first camera 128 in a location, is played back on a display 124 of the computing device 100 and included in a video edit; and causing the display 124 to overlay at least one visual indicator 180, 181, 183, 185-188 on the first video content 136, the at least one visual indicator 180, 181, 183, 185-188 indicating that second video content 236, captured by a second camera 228 at the location, is available for inclusion in the video edit.

FIG. 1 illustrates an apparatus 110 that may be a chip or a chipset. The apparatus 110 comprises one or more processors 112 (in the form of processing circuitry) and at least one memory 114 (in the form of memory circuitry). The one or more processors 112 may include a central processing unit (CPU) and a graphics processing unit (GPU). A single processor 112 and a single memory 114 are shown in FIG. 1 for illustrative purposes.

The processor 112 is configured to read from and write to the memory 114. The processor 112 may comprise an output interface via which data and/or commands are output by the processor 112 and an input interface via which data and/or commands are input to the processor 112.

The memory 114 stores a computer program which comprises computer program instructions/code 118 that control the operation of the apparatus 110 when loaded into the processor 112. The computer program instructions 118 provides the logic and routines that enable the apparatus 10 to perform the methods illustrated in FIGS. 4 and 5. The processor 112, by reading the memory 114, is able to load and execute the computer program instructions 118.

Although the memory 114 is illustrated as a single component it may be implemented as one or more separate components some or all of which may be integrated/removable and/or may provide permanent/semi-permanent/dynamic/cached storage.

The computer program instructions 117 may arrive at the apparatus 110 via any suitable delivery mechanism 40. The delivery mechanism 40 may be, for example, a non-transitory computer-readable storage medium such as a compact disc read-only memory (CD-ROM) or digital versatile disc (DVD). The delivery mechanism 40 may be a signal configured to reliably transfer the computer program instructions 118. The apparatus 110 may cause the propagation or transmission of the computer program instructions 118 as a computer data signal.

Figure 2:
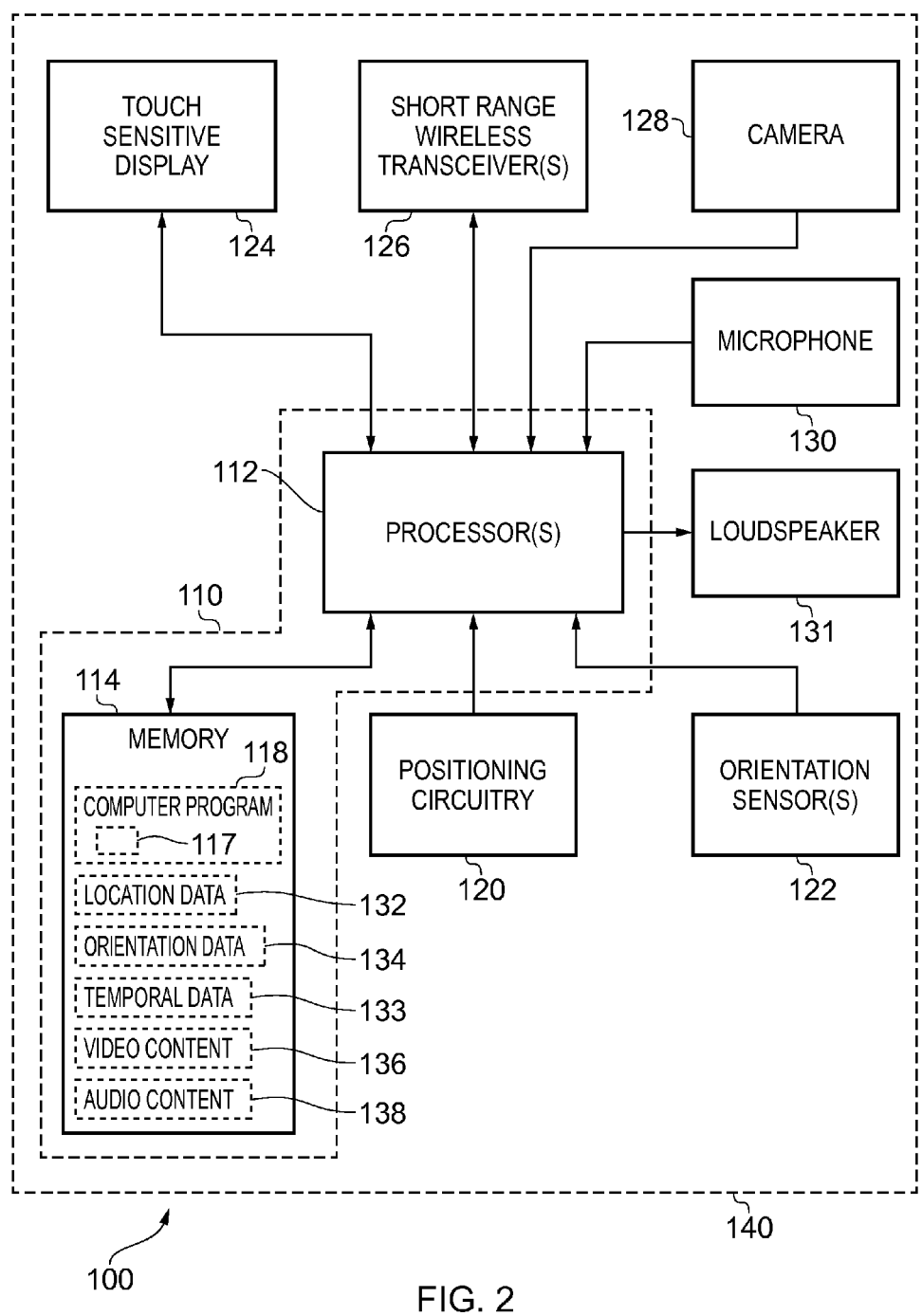
FIG. 2 illustrates a first computing device comprising the apparatus illustrated in FIG. 1.

FIG. 2 illustrates a further apparatus 100 in the form of a first computing device. The first computing device 100 may be a portable electronic device such as, for example, a mobile telephone, a dedicated camera device, a portable music player, a hand held games console or a tablet computer.

The computing device 100 illustrated in FIG. 2 includes positioning circuitry 120, one or more orientation sensor(s) 122, a display 124, one or more short range wireless transceiver(s) 126, a camera 128, a microphone 130, a loudspeaker 131, an external housing 140 and the apparatus 110 illustrated in FIG. 1. In this example, the external housing 140 houses the positioning circuitry 120, the one or more orientation sensor(s) 122, the display 124, the one or more short range wireless transceiver(s) 126, the camera 128, the microphone 130, the loudspeaker 131, the processor 112 and the memory 114.

The display 124 is configured to display information under the control of the processor 112. The display 124 may comprise any type of display technology. It may, for example, be a liquid crystal display (LCD), an organic light emitting diode (OLED) display or a quantum dot display. In this example, the display 124 is a touch sensitive display, but in others, it may not be. The touch sensitive display 124 may comprise any type of touch sensing technology. For example, it might function, for example, using capacitive, resistive, infrared, dispersive signal and/or acoustic pulse technology.

The memory 114 is illustrated in FIG. 2 as storing location data 132, temporal data 133, orientation data 134, video content 136 and audio content 138. The location data 132, temporal data 133, orientation data 134, video content 136 and audio content 138 are described in further detail below.

The processor 112 is configured to provide data to the short range wireless transceiver(s) 126 for wireless transmission and to receive inputs from the short range wireless transceiver(s) 126 in the form of data that was received wirelessly. The short range wireless transceiver(s) 126 may be configured to transmit and receive short range radio frequency signals. The short range wireless transceiver(s) 126 might be compatible with one or more radio protocols, such as Bluetooth or Wi-Fi protocols.

The processor 112 is configured to receive inputs from the positioning circuitry 120. The positioning circuitry 120 may comprise satellite positioning circuitry. The satellite positioning circuitry may be any type of satellite positioning circuitry. It may operate, for example, in accordance with one, some or any of the following satellite positioning systems: GPS (Global Positioning System), GLONASS (Globalnaya Navigatsionnaya Sputnikovaya Sistema), Beidou and Galileo. Alternatively or additionally, the positioning circuitry 120 may be configured to position the computing device 100 using terrestrial radio frequency signals rather than satellite signals. The radio frequency signals may be long range signals (such as cellular telephone signals) or short range signals (such as Bluetooth or Wi-Fi signals). In this regard, the positioning circuitry 120 may share some or all of its circuitry with the short range wireless transceiver(s) 126. Alternatively or additionally, the positioning circuitry 120 may be configured to position the computing device 100 using other means. Such means may be based, for example, on sensor-based motion tracking or measuring magnetic fields.

The processor 112 is configured to receive inputs from the one or more orientation sensors 122. The one or more orientation sensors 122 are configured to sense the orientation of the computing device 100. The processor 112 is configured to read inputs provided by the orientation sensor(s) 122. The one or more orientation sensors 122 may be configured to sense the orientation in one, two or three dimensions and may include one or more accelerometers, one or more magnetometers and/or one or more gyroscopes.

The camera 128 is configured to capture video content under the control of the processor 112. The microphone is configured to capture audio content under the control of the processor 112. The processor 112 is configured to store captured video content 136 and captured audio content 138 in the memory 114, as illustrated in FIG. 2.

The processor 112 is configured to receive data from the microphone 130 which corresponds with aural information received by the microphone 130. The processor 112 is also configured to output data to the loudspeaker 131 which is output by the loudspeaker 131 as audio. Audio processing circuitry may be present between the processor 112 and the microphone 130, and between the processor 112 and the loudspeaker 131.

The elements 112, 114, 120, 122, 124, 126, 128, 130 and 131 are operationally coupled and any number or combination of intervening elements can exist between them (including no intervening elements).

Figure 3:
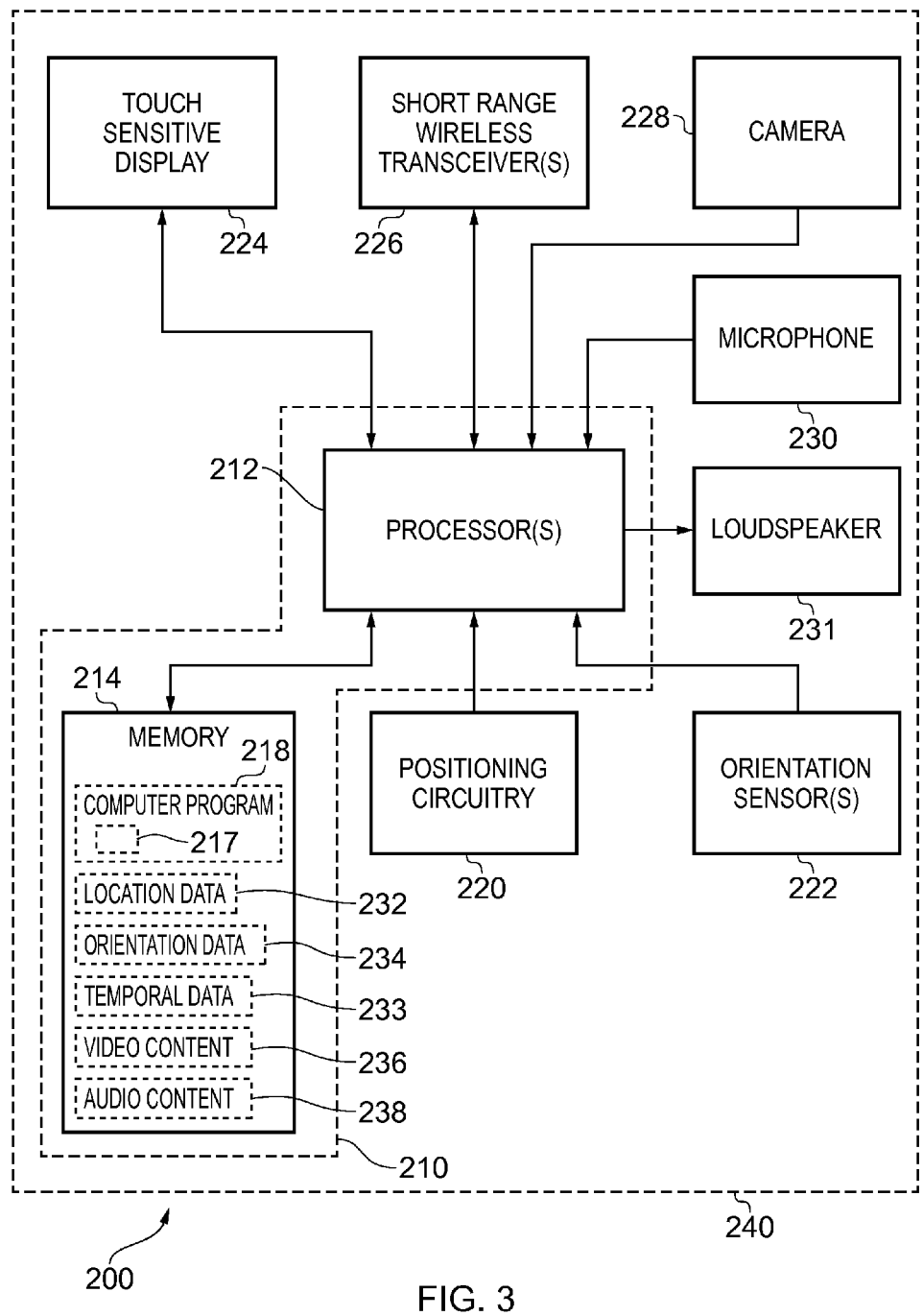
FIG. 3 illustrates a second computing device which has the same form as the first computing device illustrated in FIG. 1.

FIG. 3 illustrates a second computing device 200. In the illustrated example, the second computing device 200 is functionally the same as the first computing device 100. In other examples, the second computing device 200 might not be functionally the same as the first computing device 100.

The second computing device 200 comprises a processor 212, a memory 214, positioning circuitry 220, one or more orientation sensors 222, a touch sensitive display 224, one or more short range wireless transceivers 226, a camera 228, a microphone 230 and a loudspeaker 231. An external housing 240 houses the positioning circuitry 120, the one or more orientation sensor(s) 212, the display 224, the one or more short range wireless transceiver(s) 226, the camera 228, the microphone 230, the loudspeaker 231, the processor 212 and the memory 214.

The memory 214 is illustrated in FIG. 3 as storing a computer program 218 comprising computer program instructions 217, location data 232, temporal data 233, orientation data 234, video content 236 and audio content 238.

Figure 4:
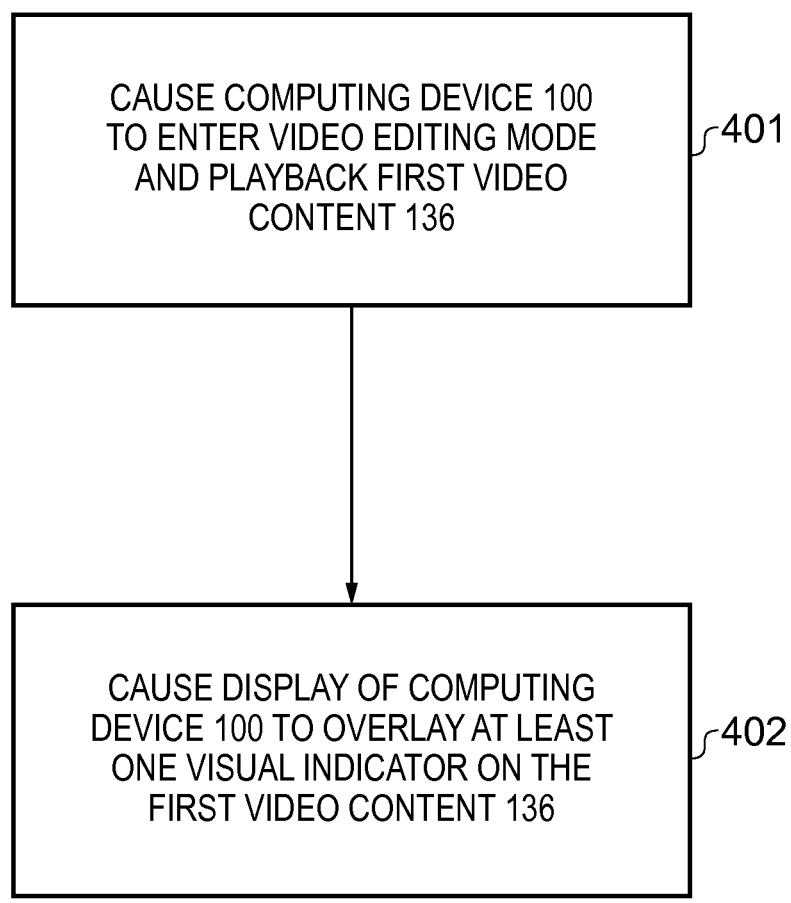
FIG. 4 illustrates a flow chart of a first method.

FIG. 4 illustrates a flow chart of a first method according to embodiments of the invention. At block 401 in FIG. 4, the processor 112 of the first computing device 100 causes the first computing device 100 to enter a video editing mode in which first video content 136, captured by a first camera 128 in a location, is played back on the display 124 of the first computing device 100 and included in a video edit.

At block 402 in FIG. 4, the processor 112 causes the computing device 100 to overlay at least one visual indicator 180, 181, 183, 185-188 on the first video content 136, the at least one visual indicator 180, 181, 183, 185-188 indicating that second video content 236, captured by a second camera 228 at the location, is available for inclusion in the video edit.

An example of a second, more detailed method according to embodiments of the invention will now be described in relation to FIGS. 5 to 11C.

Figure 5:
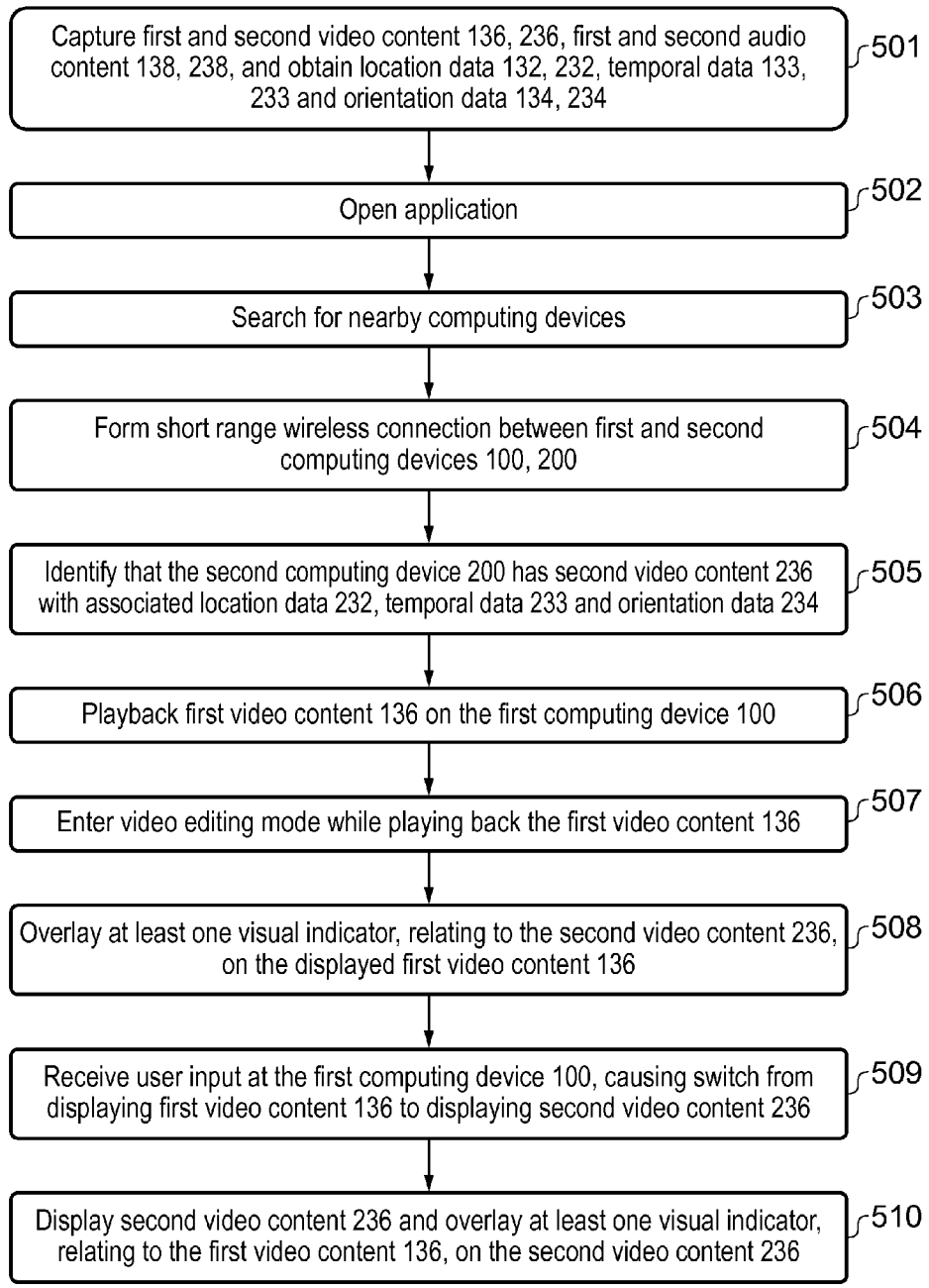
FIG. 5 illustrates a flow chart of a second method.

At block 501 in FIG. 5, in this example, a first user uses the camera 128 of the first computing device 100 to capture first video content 136 with accompanying first audio content 138. The first video and audio content 136, 138 is stored in the memory 114 of the first computing device 100. A second user uses the camera 228 of the second computing device 200 to capture second video content 236 with accompanying second audio content 238. The second video and audio content 236, 238 is stored in the memory 214 of the first computing device 200. In this example, the first user is named Jane and the second user is named Steven.

Figure 6A:
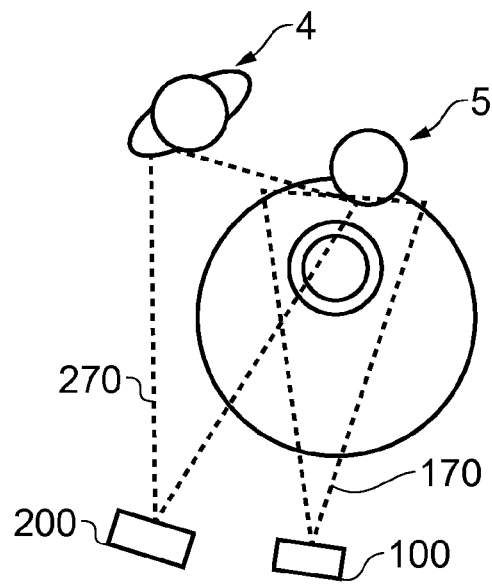
FIG. 6A illustrates a plan view of a scene being captured by first and second cameras.

FIG. 6A illustrates a plan view showing the first and second computing devices 100, 200 being used to capture a scene in the first and second video content 136, 236. The scene being captured includes John 5, blowing out the candles on his birthday cake and Albert 4, watching John blow out the candles.

The dotted triangle labelled with the reference numeral 170 indicates the field of view of the camera 128 of the first computing device 100 when the first video content 136 is captured. The dotted triangle labelled with the reference numeral 270 indicates the field of view of the camera 228 of the second computing device 200 when the second video content 236 is captured.

Just before, during or just after the first video content 136 is captured with its accompanying first audio content 138, the processor 112 of the first computing device 100 controls the positioning circuitry 120 to obtain the location of the first computing device 100 and receives one or more inputs from the orientation sensor(s) 122. The processor 112 receives location data 132 defining the location of the first computing device 100 from the positioning circuitry 120, stores it in the memory 114 and associates the location data 132 with the first video and audio content 136, 138. The location data 132 may define an absolute location or a relative location.

The processor 112 receives orientation data 134 from the orientation sensor(s) 122 which defines the orientation of the first computing device 100 (and therefore also the location and orientation of its camera 128) when the first video content 136 was captured. The orientation data 134 is stored in the memory 114 by the processor 112 in association with the first video and audio content 136, 138.

The processor 112 of the first computing device 100 also determines the time at which capture of the first video and audio content 136, 138 begins and the time at which capture of the first video and audio content 136, 138 ends and stores those times as temporal data 133 in the memory 114, in association with the first video and audio content 136, 138.

Similarly, just before, during or just after the second video content 236 is captured with its accompanying second audio content 238 by the second computing device 200, the processor 212 of the second computing device 200 controls the positioning circuitry 220 to obtain the location of the second computing device 200 and receives one or more inputs from the orientation sensor(s) 222.

The processor 212 receives location data 232 defining the location of the second computing device 200 from the positioning circuitry 220, stores it in the memory 214 and associates the location data 232 with the second video and audio content 236, 238. The location data 232 may define an absolute location or a relative location.

The processor 212 receives orientation data 234 from the orientation sensor(s) 222 which defines the orientation of the second computing device 200 (and therefore also the location and orientation of its camera 228) when the second video content 236 was captured. The orientation data 234 is stored in the memory 214 by the processor 212 in association with the second video and audio content 236, 238.

The processor 212 of the second computing device 200 also determines the time at which capture of the second video and audio content 236, 238 begins and the time at which capture of the second video and audio content 236, 238 ends and stores those times as temporal data 233 in the memory 214, in association with the second video and audio content 236, 238.

At block 502 in FIG. 5, Jane provides user input to open an application on the first computing device 100. The application is a video editing application and forms at least part of the computer program instructions 118 described above and stored in the memory 114 of the first computing device 100. The application enables a user to create a video edit which includes video content captured by different users using different cameras. When the application is open, Jane provides user input to select the first video content 136.

Following initiation of the application and selection of the first video content 136 within the application, at block 503 in FIG. 5, the processor 112 of the first computing device 100, under the control of the computer program instructions 117, causes at least one of the short range wireless transceivers 126 to search for nearby computing devices. In this example, 'nearby' refers to computing devices that are within the range of the short range wireless transceiver 126. During the search, the short range wireless transceiver 126 finds the second computing device 200, which is in the vicinity of the first computing device 100.

After the second computing device 200 has been identified, at block 504 in FIG. 5, the processor 112 of the first computing device 100 causes the short range wireless transceiver 126 to form a peer-to-peer wireless connection with the second computing device 200.

At block 505 in FIG. 5, the processor 112 of the first computing device 100 causes a request to be sent to the second computing device 200, via the peer-to-peer short range wireless connection, asking whether appropriate video content is stored on the second computing device 200. In this example, appropriate video content is video content that has been stored in association with location, temporal and orientation data as described above. If a positive response is received from the second computing device 200, the first computing device 100 sends a further request, over the peer-to-peer wireless connection, requesting the location, temporal and orientation data 232, 233, 234 associated with the video content 236 stored in the second computing device 200.

The second computing device 200 responds to the request by causing the location, temporal and orientation data 232, 233, 234 stored in its memory 214 to be transmitted to the first computing device 100 over the peer-to-peer short range wireless connection.

The location, temporal and orientation data 232, 233, 234 is received at the first computing device 100 and its processor 112 analyses it by comparing it with the location, temporal and orientation data 132, 133, 134 stored in the first computing device 100 and associated with the selected first video content 136.

The purpose of the analysis of the location data 232 in this example is to determine whether the second video content 236 was captured in substantially the 'same location' as the first video content 136. The processor 112 of the first computing device 100 may determine that the second video content 236 was captured within substantially the 'same location' if it was captured within a given range of the first video content 136. The range could, for example, be 50 meters, 10 meters or 5 meters.

The purpose of the analysis of the temporal data 233 in this example is to determine whether at least a portion of the second video content 236 was captured concurrently with at least a portion of the first video content 136. Portions of video content are considered to be concurrently if they were captured at the same time as one another. In some instances, some, but not all of second video content 236 may have been captured concurrently with the first video content 136. That is, there was a period of time where a portion of second video content 236 was being captured at the same time as a portion of the first video content 136.

If at least a portion of the second video content 236 was captured concurrently with at least a portion of the first video content 136, 138, the temporal data 133, 233 associated with the first and second video content 136, 236 may be used to align the first video content 136 with the second video content 236 temporally for editing. The first and second audio content 138, 238 may also be used for this purpose. In this case, correlation of the audio content (correlation of audio samples and/or audio features) is used to determine the alignment. Alternatively or additionally, the first and second video content 136, 236 may also be used for this purpose. In this case, the processor 112 might compare the first and second video content 136, 236 to determine whether at least some of the same information/content is present in both the first video content 136 and the second video content 236.

The purpose of the analysis of the orientation data 234 may, for example, be to determine whether:

i) the camera 228 of the second computing device 200 was directed towards (at least part of) the same scene as that captured in the first video content 136 by the camera 128 of the first computing device 100; and/or ii) the camera 128 of the first computing device 100 was directed towards (at least part) of the same scene as that captured in the second video content 236 by the camera 228 of the second computing device 200.

In this regard, the processor 112 of the first computing device 100 might, for example, analyse the orientation data 232 associated with the second video content 236 to determine whether it defines an orientation that is within a given angular range of an orientation defined in the orientation data 134 associated with the first video content 136. Alternatively or additionally, the processor 112 might compare the first and second video content 136, 236 to determine whether the video content contains overlapping regions.

While in this example the processor 112 of the first computing device 100 analyses location, temporal and orientation data 232, 233, 234 associated with the second video content 236 and compares it with location, temporal and orientation data 132, 133, 134 associated with the first video content 136, in other examples, it may only analyse and compare the location data 132, 232 and the temporal data 133, 233. In these other examples, orientation data 134, 234 may or may not be stored in association with video content.

In this example, the processor 112 of the first computing device 100 determines that the location, temporal and orientation data 232, 233, 234 associated with the second video content 236 corresponds with the location, temporal and orientation data 132, 133, 134 associated with the first video content 136. This is because:

a) the second video content 236 was captured in substantially the same location as the first video content 136;

b) there is an overlap in the time periods over which the first and second video content 136, 236 were captured; and c) the cameras 128, 228 of the first and second computing devices 100, 200 were similarly oriented when the first and second video content 136, 236 was captured.

At block 506 in FIG. 5, Jane provides user input at the first computing device 100 which causes the processor 112 to commence playback of the first video content 136 on the first computing device 100, within the application. The first audio content 138, which accompanies the first video content 136, is output by the loudspeaker 131. At block 507 in FIG. 5, the processor 112 of the first computing device 100 causes the first computing device 100 to enter a video editing mode. The video editing mode may, for example, be entered when playback of the first video content 136 commences, or in response to further user input after playback has commenced.

In the video editing mode, at block 508 in FIG. 5, the processor 112 of the first computing device 100 causes the display 124 of the first computing device 100 to overlay one or more visual indicators 160, 180 on the first video content 136.

Figure 6B:
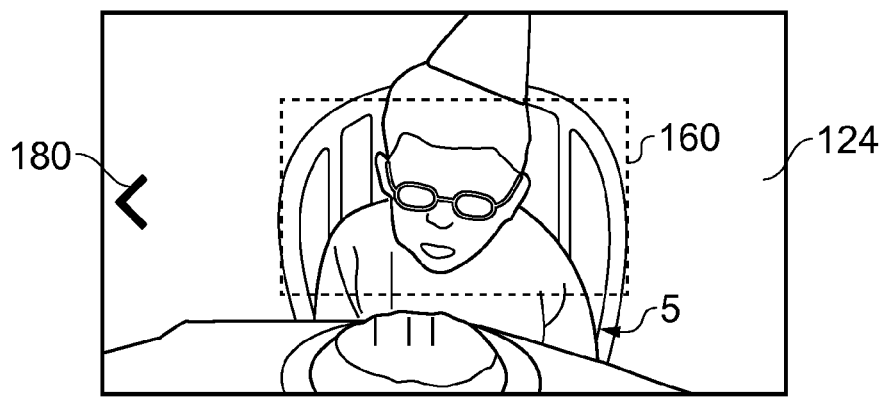
FIG. 6B illustrates a display of a first computing device displaying first video content captured by the first camera in FIG. 6A and an example of a visual indicator, overlaying the first video content, indicating that second video content is available for inclusion in a video edit.

A first visual indicator 160 illustrated in FIG. 6B is a box formed by a dotted line. The first visual indicator 160 indicates a potential region of interest in the first video content 136 that has been identified by the processor 112 of the first computing device 100. Potential regions of interest may be, or include, objects of interest. Objects of interest may, for instance, include human bodies, faces, (domestic) animals, objects that are identifiable against a background (such as, for instance, a skyscraper against a blue sky), objects which have been captured sharply in the image (vs. being blurred and/or in the background), etc.

In some embodiments of the invention, visual indicators indicating regions of interest are only displayed when video content has been paused (that is, after user input has been provided to pause the video content). In other embodiments of the invention, visual indicators indicating regions of interest are displayed while video content is playing.

A user may provide input to select an indicated region of interest. For example, in the illustrated example, Jane could select the region of interest indicated by the dotted box 160 in FIG. 6B by touching the display 124 inside the box 160. If such input is provided, the video edit switches to the selected region of interest. For example, the video may 'zoom' into the selected region of interest and portions of video outside around the region of interest may be removed from display.

A video edit is created as video content is played back. The video content that is included in the edit is the same as the video content that displayed and played back on the display 124. So, if a selected region of interest is (only) displayed over a particular time interval during video playback, that is what will be contained in that time interval of the video edit. For instance, if the region of interest indicated by the visual indicator 160 is selected between 1 minute and 30 seconds and 1 minute and 45 seconds in the video edit, that region of interest is (only) what will be present during that time interval in the video edit.

A second visual indicator 180 that overlays the first video content 136 in FIG. 6B has the form of an arrow. This second visual indicator 180 indicates that second video content 236, captured by the camera 228 of the second computing device 200, is available for inclusion in the video edit. That is, a portion of the second video content 236 (for example, one or more frames of the second video content 236) was captured concurrently with the portion of the first video content currently being displayed on the display 124.

The second visual indicator 180 in FIG. 6B is indicative of the perspective of the scene which was captured concurrently in the second video content 236 by the camera 228 of the second computing device 200. In this example, the second visual indicator 180 is an arrow pointing left, which indicates that the perspective of the scene that was captured concurrently (by the camera 228 of the second computing device 200) in the second video content 236 is to the left of the scene currently being displayed. In other words, the second visual indicator 180 provides an indication of the location of the field of view of the second camera 228 at an instance in time which corresponds with the instance in time at which content, from the first video content 136 and currently displayed on the display 124, was captured. The visual indicator 180 may move on the display 124 as the first video content 136 is played back.

The processor 112 of the first computing device 100 may process the location data and the orientation data 232, 234, associated with the second video content 236 and received from the second computing device 200, in order to determine where to position the second visual indicator 180 on the display 124. For example, the processor 112 may compare the location and orientation data 232, 234 associated with the second video content 236 with the location and orientation data 132, 134 associated with the first video content 136 in order to determine where to position the second visual indicator 180 on the display 124.

If, for example, the distance between the first and second computing devices 100, 200 is increased beyond the range of the peer-to-peer short range wireless connection between them (for example, because one is moved away from the other), the processor 112 of the first computing device 100 may cause the display 124 of the first computing device 100 to cease overlaying the second visual indicator 180 on the first video content 136.

At block 509 in FIG. 5, Jane provides user input at the first computing device 100 which causes the processor 112 of the first computing device 100 to switch from displaying, in the video editing mode, the first video content 136 to displaying the second video content 236. This switch occurs in block 510 of FIG. 5 and causes at least a portion of the second video content 236 to be played back and included in the video edit. The input provided by Jane in block 509 of FIG. 5 could, for instance, be touch input provided at the second visual indicator 180.

In this example, when the first computing device 100 switches from displaying the first video content 136 to the second video content 236, it does not switch from outputting the first audio content 138 to outputting the second audio content 238. However, in other examples, the computing device 100 might switch from outputting the first audio content 138 to outputting the second audio content 238.

In this example, any portion of the second video content 236 which is played back on the display 124 of the first computing device 100 in video editing mode is included in the video edit.

If, for example, the first video content 136 is played back for a first period of time (for instance, 30 seconds) in the video editing mode and then user input is provided that causes the switch to the second video content 236, which is then played back for a second period of time (for instance, a further 20 seconds), the video edit includes a portion of the first video content 136 for the first period of time followed by a portion of the second video content 236 for the second period of time. The portion of the second video content 236 that is present in the video edit is that which was captured in the second video content 236 immediately after the portion of the first video content 136 which is included in the video edit.

In this example, two portions of content that were captured concurrently in the first and second video content 136, 236 cannot both be included in the video edit.

Figure 6C:
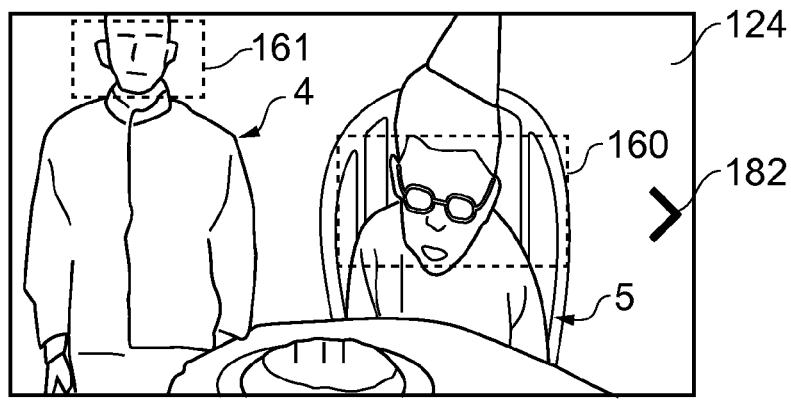
FIG. 6C illustrates a display of the first computing device after a user has provided input to cause the display to change from displaying the first video content to displaying the second video content.

FIG. 6C illustrates the display 124 of the first computing device 100 after it has switched from displaying the first video content 136 to displaying the second video content 236. Three visual indicators 160, 161, 182 are overlaid on the second video content 236. First and second visual indicators 160, 161 indicate potential regions of interest, in the same manner as that described above in relation to FIG. 6B.

A third visual indicator 182 is indicative of the perspective of the scene which was captured concurrently in the first video content 136 by the camera 128 of the first computing device 100. In this example, the third visual indicator 182 is an arrow pointing right, which indicates that the perspective of the scene that was captured concurrently (by the camera 128 of the first computing device 100) in the first video content 136 is to the right of the scene displayed in the second video content 236. That is, the third visual indicator 182 provides an indication of the location of the field of view of the first camera 128 at an instance in time which corresponds with the instance in time at which content, from the second video content 236 and currently displayed on the display 124, was captured.

Only portions of video content which are played back while the first computing device 100 is in the video editing mode are included in the video edit in this example. Any portions of the first video content 136 and the second video content 236 which are not played back on the first computing device 100 while it is in video editing mode are not included in the video edit.

The processor 112 of the first computing device 100 may process the location and orientation data 132, 134 associated with the first video content 136 in order to determine where to position the third visual indicator 182 on the display 124. For example, the processor 112 may compare the location and orientation data 132, 134 associated with the first video content 136 with the location and orientation data 232, 234 associated with the second video content 236 in order to determine where to position the third visual indicator 182 on the display 124.

In some examples, the first computing device 100 begins to receive (for example, stream) the second video content 236 from the second computing device 200 prior to the second video content 236 being displayed on the first computing device 100 (using the peer-to-peer short range wireless connection set up in block 504 of FIG. 5). The receiving/streaming of the second video content 236 might begin when playback of the first video content 136 commences in the video editing mode, or at some point in time after then but before the second video content 236 is displayed.

In this example, the received/streamed second video content 236 is not displayed on the display 124 until the user input is provided in block 509 of FIG. 5, but reception of the second video content 236 in advance of that user input enables the processor 112 of the first computing device 100 to switch from displaying the first video content 136 to displaying the second video content 236 in a seamless fashion when the user input is provided.

Since the second video content 236 and its associated location data 232, temporal data 233 and orientation data 234 are transferred from the second computing device 200 to the first computing device 100 using a peer-to-peer connection, in this example, no server is required.

Figure 7:
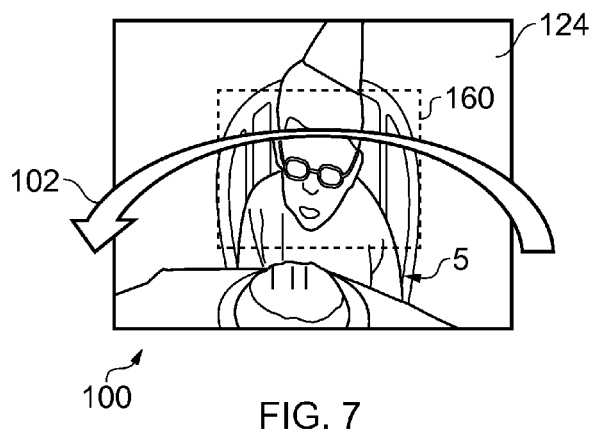
FIG. 7 illustrates the first computing device and an arrow indicating the direction of a tilt gesture that may be provided by a user to cause the display of the first computing device to change from displaying the first video content to displaying the second video content.

In some embodiments of the invention, the input that is provided at block 509 of FIG. 5 to switch from displaying the first video content 136 to displaying the second video content 236 is not a touch input. It could, for example, be a gesture input provided by tilting the computing device 100. FIG. 7 illustrates such an example. The arrow labelled with the reference numeral 102 illustrates the direction that the computing device 100 is tilted in to cause the switch to occur.

Figure 8:
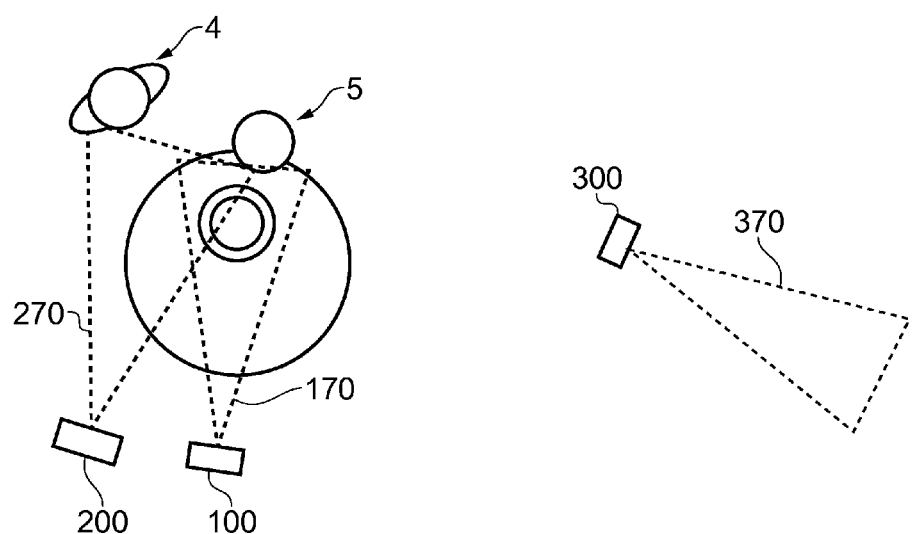
FIG. 8 illustrates a plan view of a scene in which a third computing device is capturing third video content of a different scene from that illustrated in FIGS. 6A to 7.

FIG. 8 illustrates a plan view of a scene in which a first, second and third computing devices 100, 200, 300 are being used concurrently to capture first, second and third video content respectively. The fields of view of the cameras of the first, second and third computing devices 100, 200, 300 are illustrated by the dotted triangles labelled with the reference numerals 170, 270 and 370 respectively.

The first and second computing devices 100, 200 are positioned in the same positions as those illustrated in FIG. 6A. While the third computing device 300 is located in substantially the same position as the first and second computing devices 100, 200, it can be seen that the camera of the third computing device 300 is pointing in a different direction from the first and second computing devices 100, 200 and, as result, is capturing a different scene from the first and second computing devices 100, 200.

In this example, if the first computing device 100 receives, from the third computing device 300, location, temporal and orientation data associated with video content captured by the third computing device 300, the processor 112 of the first computing device 100 will compare that location, temporal and orientation data with the location, temporal and orientation data 132, 133, 134 associated with the first video content 136 captured by the first computing device 100. When the comparison is made, the processor 112 will determine that the third computing device 300 was not directed at the same scene as the first computing device 100 when the first and third video content is captured. Consequently, the processor 112 of the first computing device 100 may decide that the third video content is unsuitable for inclusion in the video edit.

Figure 9A:
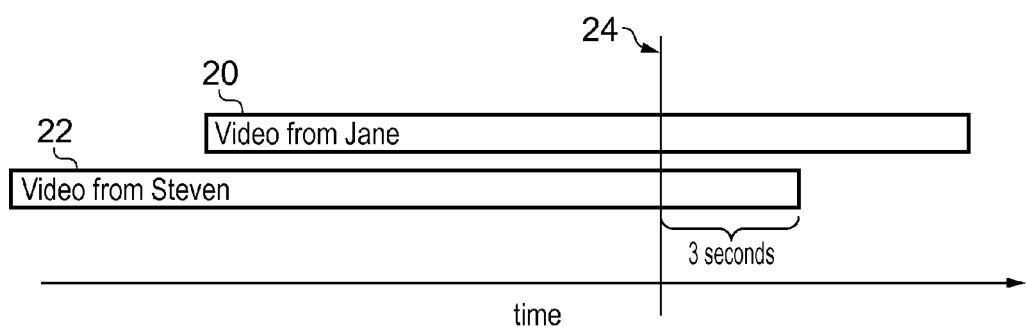
FIG. 9A illustrates a graph indicating when the first video content was captured relative to the second video content.

In some examples, the visual indicators that overlay video content in the video editing mode may be different from those described above. FIG. 9A illustrates a graph indicating when the first video content 136 was captured relative to the second video content 236. The bar labelled with the reference numeral 20 relates to the first video content 136 captured by the first computing device 100 and the bar labelled with the reference numeral 22 relates to the second video content 236 captured by the second computing device 200. It can be seen from FIG. 9A that there is a period of time where the first and second video content 136, 236 was captured concurrently.

Figure 9B:
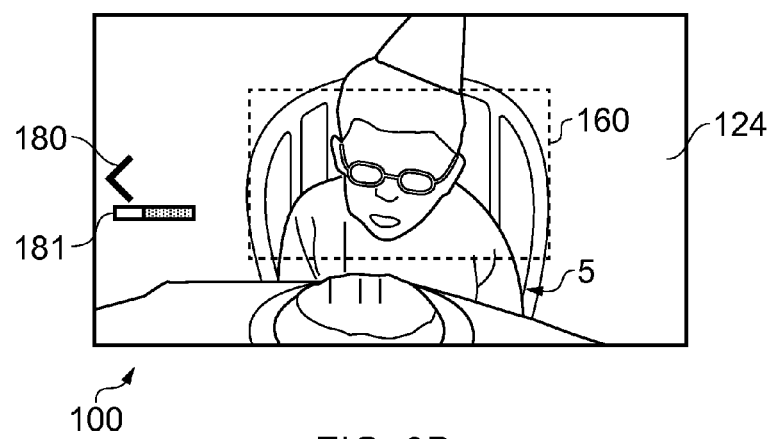
FIG. 9B illustrates the display of the first computing device displaying the first video content and examples of multiple overlaid visual indicators, one of which is a temporal visual indicator.

FIG. 9B illustrates the display 124 of the first computing device 100, while the first computing device 100 is in the video editing mode, at the instance in time indicated by the line labelled with the reference numeral 24 in FIG. 9A. At that instance in time 24, a portion of the second video content 236 (lasting 3 seconds from that instance in time 24) is available for inclusion in the video edit. It can be seen that the first and second visual indicators 160, 180 are overlaid on the first video content 136 as shown in FIG. 6B along with an additional, third, visual indicator 181. The third visual indicator 181 indicates the time period that second video content 236 is available for inclusion in the video edit (in this case, 3 seconds). Once that time period has lapsed, if the first video content 136 is being displayed, the processor 112 will cause the display 124 to cease displaying the second and third visual indicators 180, 181. If the second video content 236 is being displayed by the display 124 of the first computing device 100 when it ends, the processor 112 of the first computing device 100 causes the display 124 to switch from displaying the first video content 136 to displaying the second video content 236.

Figure 10A:
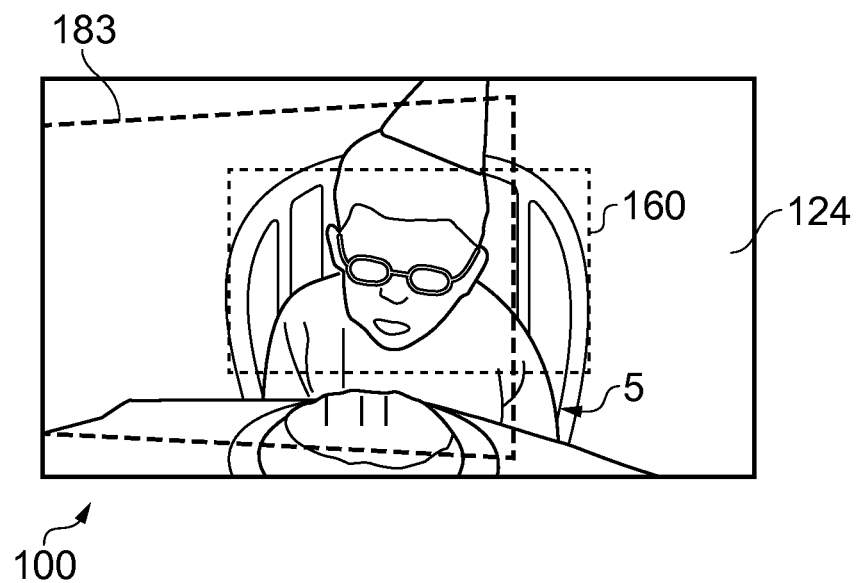
FIG. 10A illustrates the display of the first computing device displaying the first video content with a further example of an overlaid visual indicator, indicating that the second video content is available for inclusion in a video edit.

FIG. 10A illustrates a different form of visual indicator 183 from the second visual indicator 180 shown in FIG. 6B. The visual indicator 183 also indicates a perspective of a scene captured in the second video content 236 by the camera 228 of the second computing device 200. However, in FIG. 10A, the visual indicator 183 indicates where the location of the field of view of the camera 228 in the second video content 236 was, when the displayed portion/frame of the first video content 136 was captured, in the form of an area defined by one or more dotted lines. The visual indicator 183 may move on the display 124 as the first video content 136 is played back.

Figure 10B:
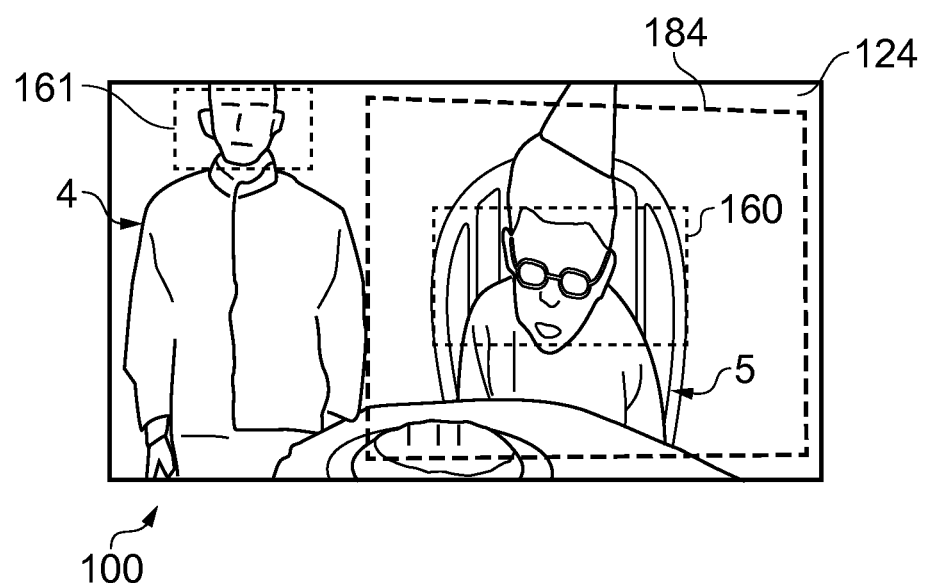
FIG. 10B illustrates the display of the first computing device displaying the second video content with a further example of an overlaid visual indicator, indicating that the first video content is available for inclusion in a video edit.

Similarly, FIG. 10B illustrates a different form of visual indicator 183 from the third visual indicator 182 shown in FIG. 6C. The visual indicator 184 also indicates a perspective of a scene captured in the first video content 136 by the camera 128 of the first computing device 100. However, in FIG. 10B, the visual indicator 182 indicates where the location of the field of view of the camera 128 in the first video content 136 was, when the displayed portion/frame of the second video content 236 was captured, in the form of an area defined by one or more dotted lines. The visual indicator 182 may move on the display 124 as the second video content 236 is played back.

Figure 11A:
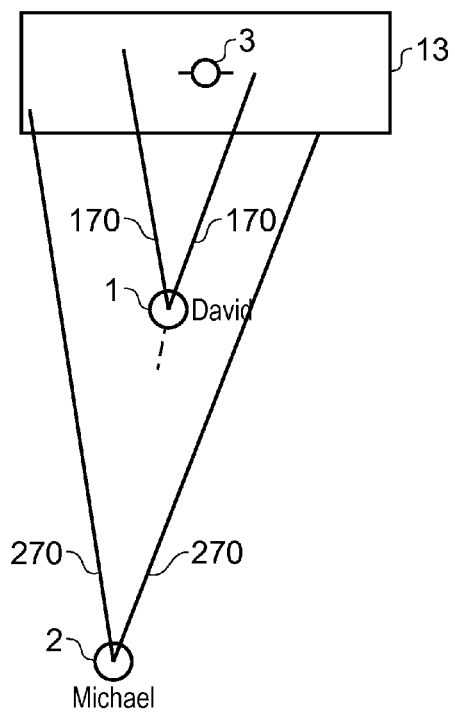
FIG. 11A illustrates a plan view of two people capturing video of a scene.

FIG. 11A illustrates a plan view of two people, David (labelled with the reference numeral 1) and Michael (labelled with the reference numeral 2) capturing a scene using the cameras 128, 228 of the first and second computing devices 100, 200. David is holding the first computing device 100 and Michael is holding the second computing device 200. The first computing device 100 captures first video and audio content 136, 138 and the second computing device captures second video and audio content 236, 238.

The field of view of the camera 128 of the first computing device 100 illustrated by the lines labelled with the reference numeral 170 in FIG. 11A. The field of view of the camera 228 of the second computing device 200 illustrated by the lines labelled with the reference numeral 270 in FIG. 11A.

In the example illustrated in FIG. 11A, the scene being captured by the first and second computing devices 100, 200 is a person 3, on a stage 13 at a political rally.

Figure 11B:
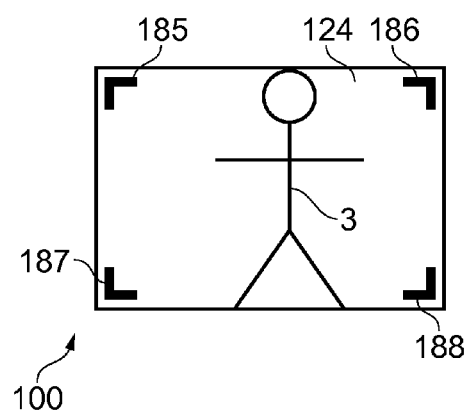
FIG. 11B illustrates a first computing device displaying first video content, captured by a first camera in FIG. 11A, being displayed with multiple visual indicators indicating that second video content is available for inclusion in a video edit.
Figure 11C:
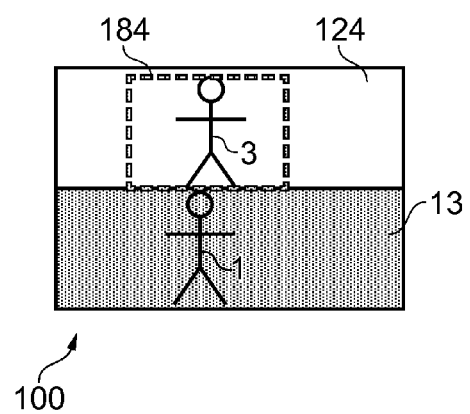
FIG. 11C illustrates second video content captured by a second camera in FIG. 11B being displayed on the first computing device.

David is positioned closer to the scene being captured than Michael. FIG. 11B illustrates a display 124 of the first computing device 100 playing back first video content 136, captured by David using the first computing device 100, in the video editing mode.

In the example illustrated in FIG. 11B, the processor 112 of the first computing device 100 has determined, from location and orientation data 232, 234 received from the second computing device 200, that the camera 228 of the second computing device 200 was positioned behind the first computing device 100 and directed at the same scene as the camera 128 of the first computing device 100 when the second video content 236 was captured.

Consequently, the processor 112 of the first computing device 100 overlays the first video content 136 with four visual indicators 185, 186, 187, 188, as illustrated in FIG. 11B, when the first video content 136 is played back in the video editing mode. The overlaid visual indicators 185-188 are positioned in the four corners of the display 124, indicating the perspective of the scene captured by the camera 228 of the second computing device 200.

FIG. 11B illustrates the display 124 of the first computing device 100 displaying the second video content 236 after a switch from displaying the first video content 136 to displaying the second video content 236 (as explained above in relation to blocks 509 and 510 of FIG. 5). In this example, the visual indicator 184 has the same form as that illustrated in FIG. 10B.

References to 'computer', 'computer-readable storage medium', 'processor' etc. should be understood to encompass not only computers having different architectures such as single/multi-processor architectures and sequential (Von Neumann)/parallel architectures but also specialized circuits such as field-programmable gate arrays (FPGA), application specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in FIGS. 4 and 5 may represent steps in a method and/or sections of code in the computer program 118. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For instance, in some examples, the first computing device 100 may automatically search for other computing devices 200, 300 just before, during or just after video is captured, using a short range wireless transceiver 126 in order to identify other computing devices 200, 300 that are capturing/have captured video content concurrently. If one or more other computing devices 200 are identified, the first computing device 100 may either:

i) transfer location, temporal and orientation data 232, 233, 234 from the identified computing device(s) 200 and video content 236 captured concurrently by the identified computing device(s) 200 (and possibly also audio content 238);

ii) transfer contact information from the identified computing device(s) 200, which can be used to contact the computing device(s) 200 remotely in future in order to obtain location, temporal and orientation data 232, 233, 234, video content 236 and possibly also audio content 238 from the identified computing device(s) 200 (for example, over the internet using a peer-to peer connection); or iii) transfer location, temporal and orientation data 232, 233, 234 from the identified computing device(s) 200 and transfer contact information from the identified computing device(s) 200, which can be used to contact the computing device(s) 200 remotely in future in order to obtain video content 236 and possibly also audio content 238 from the identified computing device(s) 200 (for example, over the internet using a peer-to peer connection).

In some embodiments, it is not necessary for the first computing device 100 to receive temporal data 233 from the second computing device 200 in order to determine whether portions of the first and second video content 136, 236 were captured concurrently. For example, alternatively (or additionally), the processor 112 of the first computing device 100 may analyse the first and second audio content 138, 238 and/or the first and second video content 136, 236 for matching features in order to determine whether concurrent capture occurred (and in order to align the first and second video content 136, 236 temporally for editing).

The processor 112 of the first computing device 100 may also compare the first video content 136 with the received second video content 236 (in addition, or as alternative to analysing the received orientation and location data 232, 234 associated with the second video content 236) in order to determine where to position the visual indicators 180, 181, 183, 185-188 on the first video content 136. A similar analysis may be performed by the processor 112 of the first computing device 100 to determine where to position the visual indicators 182, 184 on the second video content 236.

In the examples described above, a video edit is created on the first computing device 100 using first video content 136 captured by a camera 128 of the first computing device 100. In other examples, however, the first video content 136 may have been captured by a different camera.

A peer-to-peer connection is used to identify appropriate video content and to transfer video content between computing devices in the examples described above. In other examples, appropriate video content may instead be stored on a server and retrieved from the server by the first computing device 100.

In some implementations, when the touch sensitive display 124 of the first computing device 100 is displaying video content with an overlaid visual indicator (such as the arrow indicators 180, 182 illustrated in FIGS. 6B and 6C), if the user provides a closing pinch gesture by placing a digit on the visual indicator and a digit on the displayed video content and then brings the digits together on the surface of the display 124, the processor 112 may respond by causing the display 124 to display the first and second video content 136, 236 simultaneously in a panoramic or split screen view.

In the examples described above, some visual indicators (for example, the arrows 180, 182 in FIGS. 6B, 6C and 9B) are overlaid on video content in a position that indicates the perspective of the scene that was captured concurrently by another camera. In some implementations, a single visual indicator could relate to multiple portions of concurrently captured video content that were captured by multiple cameras. In such implementations, user selection of such a visual indicator (for example, by a user touching the visual indicator) may cause multiple thumbnail images of the portions of video content, represented by the selected visual indicator, to be displayed. The video content that was being played back may also be paused. A user may select which video content he wishes to switch to in the video edit by selecting the appropriate thumbnail image. Alternatively, the selectable thumbnail images for each portion of video content may be displayed concurrently with the visual indicator while video content is being played back on the display and a video edit is being created.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

The invention claimed is:

1. An apparatus comprising: a processor; memory including computer program code, the memory and the computer program code configured to, working with the processor, cause the apparatus to perform at least the following:

cause the apparatus to enter a video editing mode in which first video content, captured by a first camera in a location, is played back on a display and included in a video edit;

cause the display to overlay at least one visual indicator on the first video content, the at least one visual indicator indicating that second video content, captured by a second camera at the location, is available for inclusion in the video edit; and processing orientation data from an orientation sensor received from a different computing device to determine where to position the at least one visual indicator on the display, wherein the orientation data defines an orientation of the second camera when the second video content was captured.

2. The apparatus of claim 1, wherein the orientation data defines a location at which the second video content was captured by the second camera.

3. The apparatus of claim 1, wherein the second camera is part of the further computing device.

4. The apparatus of claim 1, wherein the at least one visual indicator indicates that the second video content is available via a short range wireless peer-to-peer wireless connection.

5. The apparatus of claim 4, wherein the memory and the computer program code are further configured to, working with the processor, cause the apparatus to further perform determining that the second video content is no longer available via the short peer-to-peer wireless connection, and responding by causing the display of the computing device to cease overlaying the at least one visual indicator on the first video content.

6. The apparatus of claim 1, wherein the at least one visual indicator indicates a perspective captured by the second camera, at the location concurrently with the capture of the first video content, in the second video content.

7. The apparatus of claim 6, wherein the first video content includes a scene, and the at least one visual indicator indicates a perspective of the scene captured in the second video content.

8. The apparatus of claim 1, wherein the memory and the computer program code are further configured to, working with the processor, cause the apparatus to further perform responding to user input at the apparatus by causing the display to change from displaying, in the video editing mode, the first video content to displaying the second video content.

9. The apparatus of claim 8, wherein switching to the second video content causes a portion of the second video content to be played back and included in the video edit.

10. The apparatus of claim 9, wherein any portions of the second video content that are not played back on the display are not included in the video edit.

11. A method comprising:
causing an apparatus to enter a video editing mode in which first video content, capturing by a first camera in a location, is played back on a display and included in a video edit;
causing the display to overlay at least one visual indicator on the first video content, the at least one visual indicator indicating that second video content, captured by a second camera at the location, is available for inclusion in the video edit; and
processing orientation data from an orientation sensor received from a different computing device to determine where to position the at least one visual indicator on the display, wherein the orientation data defines an orientation of the second camera when the second video content was captured.

12. The method of claim 11, wherein the orientation data defines a location at which the second video content was captured by the second camera.

13. A non-transitory computer-readable medium encoded with instructions that, when executed by a computer, perform:
causing an apparatus to enter a video editing mode in which first video content, capturing by a first camera in a location, is played back on a display and included in a video edit;
causing the display to overlay at least one visual indicator on the first video content, the at least one visual indicator indicating that second video content, captured by a second camera at the location, is available for inclusion in the video edit; and
processing orientation data from an orientation sensor received from a different computing device to determine where to position the at least one visual indicator on the display, wherein the orientation data defines an orientation of the second camera when the second video content was captured.

14. The medium of claim 13, wherein the orientation data defines a location at which the second video content was captured by the second camera.

* * * * *